(12) United States Patent
Kozuka et al.

(10) Patent No.: US 7,008,516 B2
(45) Date of Patent: Mar. 7, 2006

(54) METHOD AND APPARATUS FOR DESALINATING AND CONCENTRATING SEA WATER, DESALINATED DEEP WATER AND CONCENTRATED DEEP WATER

(76) Inventors: Yoshinobu Kozuka, 24-3, Tamaboko-machi i, Kanazawa-shi, Ishikawa-ken (JP) 921-8003; Yoshimasa Shimbo, 16-26, Izumino-machi 1-chome, Kanazawa-shi, Ishikawa-ken (JP) 921-8034

( * ) Notice: Subject to any disclaimer, the term of this patent is extended or adjusted under 35 U.S.C. 154(b) by 315 days.

(21) Appl. No.: 10/254,503

(22) Filed: Sep. 26, 2002

(65) Prior Publication Data
US 2003/0062323 A1    Apr. 3, 2003

(30) Foreign Application Priority Data
Sep. 28, 2001 (JP) ............................. 2001-301980
Apr. 15, 2002 (JP) ............................. 2002-112339

(51) Int. Cl.
*B01D 1/18* (2006.01)
*B01D 3/10* (2006.01)
*C02F 1/04* (2006.01)

(52) U.S. Cl. .................. 203/11; 159/2.1; 159/45; 159/48; 159/47.3; 159/DIG. 16; 202/205; 203/48; 203/91; 203/DIG. 17

(58) Field of Classification Search .......... 159/4.3, 159/45, 2.1, 48, 47.3, DIG. 16; 202/205, 202/236; 203/10, 11, 91, 92, 48, DIG. 17; 23/295 R, 306; 210/748, 774
See application file for complete search history.

(56) References Cited

U.S. PATENT DOCUMENTS

| | | | | |
|---|---|---|---|---|
| 3,559,879 A | * | 2/1971 | Bechard | 494/13 |
| 3,591,317 A | * | 7/1971 | James | 417/362 |
| 3,997,408 A | * | 12/1976 | Barba et al. | 202/236 |
| 4,176,012 A | * | 11/1979 | Bryant | 202/172 |
| 4,371,508 A | * | 2/1983 | Weinzierl et al. | 423/243.03 |
| 4,525,242 A | * | 6/1985 | Iida | 202/177 |
| 5,488,828 A | * | 2/1996 | Brossard | 60/675 |
| 6,875,358 B1 | * | 4/2005 | Aarebrot et al. | 210/634 |

FOREIGN PATENT DOCUMENTS

| | | |
|---|---|---|
| JP | A 2000-23646 | 1/2000 |
| JP | A 2000-354864 | 12/2000 |
| JP | A 2001-129542 | 5/2001 |
| JP | A 2001-211864 | 8/2001 |

* cited by examiner

*Primary Examiner*—Virginia Manoharan
(74) *Attorney, Agent, or Firm*—Oliff & Berridge, PLC

(57) ABSTRACT

According to a method of desalinating sea water, sea water sampled from deep sea is injected into a decompression chamber of a reduced pressure tank having a steam chamber, steam at an atmospheric pressure superheated to a boiling temperature or higher by high-frequency heating is supplied to the steam chamber at a surrounding of the decompression chamber at an interval of a heat conducting wall therebetween, water in the sea water is evaporated by heating sea water in the decompression chamber and the evaporated water is condensed to thereby provide fresh water. Concentrated sea water remains in the decompression chamber and therefore, the method can be utilized also as a method of concentrating sea water. Salt can be obtained by further evaporating the water of the concentrated sea water as necessary.

23 Claims, 3 Drawing Sheets

METHOD AND APPARATUS FOR DESALINATING AND CONCENTRATING SEA WATER, DESALINATED DEEP WATER AND CONCENTRATED DEEP WATER

Japanese Patent Application No. 2001-301980 filed on Sep. 28, 2001 and Japanese Patent Application No. 2002-112339 filed on Apr. 15, 2002 are hereby incorporated by reference in their entirety.

BACKGROUND OF THE INVENTION

The present invention relates to a method of desalinating sea water, a method of concentrating sea water (including making salt) and apparatus thereof particularly preferable in utilizing sea water sampled from deep sea (deep water) as raw materials or additives of commodities of foods, beverages, condiments, cosmetics and the like. The invention further relates to desalinated deep water and concentrated deep water (including salt) obtained by the methods. Particularly, the invention relates to methods, apparatus and products characterized in superheated steam constituting a heat source in evaporating to desalinate or condense water in sea water.

It has been carried out from ancient time to evaporate and condense to desalinate the water in sea water and providing salt by further heating remaining concentrated sea water. Further, it is a generally executed technology to use steam in heating liquid. In heating by steam, when temperature of steam for heating is not higher than boiling temperature of liquid to be heated to some degree, rapid heat conduction cannot be expected and efficient processings cannot be carried out. In evaporating the water in sea water by heating by steam, it is necessary to make temperature of steam for heating higher than the boiling point of water and therefore, pressurized steam is used. Therefore, a heating vessel or a boiler for generating steam becomes a pressure vessel and a consideration needs to be given to strength or air tightness of the vessel.

Further, deep water sampled from deep sea includes mineral contents different from those of normal sea water and therefore, there has been commercialized drinking water or cosmetics using mineral including water produced by desalinating or reducing salt of the deep water. Conventionally, as a method of desalinating or condensing deep water, there has been proposed an ion exchange method (Japanese Patent Application Laid-Open No. 2001-211864), a freezing method (Japanese Patent Application Laid-Open No. 2001-129542), an electrolysis method (Japanese Patent Application Laid-Open No. 2000-23646), or a reverse osmosis method (Japanese Patent Application Laid-Open No. 2000-354864).

BRIEF SUMMARY OF THE INVENTION

The present invention may provide a method and an apparatus capable of desalinating or concentrating sea water efficiently under reduced pressure or capable of making salt from sea water.

The present invention may also provide a method and an apparatus capable of adjusting a rate of a solute (salt content or mineral content) included in the obtained fresh water or concentrated sea water in accordance with usage thereof, when fresh water, concentrated sea water or salt obtained from sea water, for example, deep water is utilized in various commodities.

Further, the present invention may provide desalinated deep water and concentrated deep water obtained by the above-described methods.

According to a first aspect of the present invention, there is provided a method of desalinating sea water comprising steps of:

injecting sea water into a decompression chamber;

evaporating water in the sea water by heating the sea water in the decompression chamber by supplying steam at an atmospheric pressure superheated to a temperature equal to or higher than a boiling temperature by high-frequency heating to a steam chamber formed around the decompression chamber with a heat conducting wall interposed therebetween; and obtaining fresh water by condensing the evaporated water.

According to a second aspect of the present invention, there is provided a method of concentrating sea water including a step of evaporating water by heating sea water in the above-described decompression chamber and thereafter a step of obtaining concentrated sea water remaining in the decompression chamber.

Further, according to a third aspect of the present invention, there is provided a method of making salt including a step of obtaining salt by further evaporating water in the concentrated sea water obtained by a method according to the second aspect of the present invention.

In the first to third aspects of the present invention, as means for obtaining the superheated steam at the atmospheric pressure, a method of spraying air passing through a high-frequency coil with water, or a method of passing saturated steam produced by a boiler through a steam pipe wound with a high-frequency coil, is practically desirable.

According to a fourth aspect of the present invention, there is provided an apparatus for concentrating sea water comprising:

a decompression chamber;

a steam chamber provided around the decompression chamber;

a heat conducting wall which divides the decompression chamber and the steam chamber;

a sea water injection section which injects sea water into the decompression chamber;

a vacuum-suction section which vacuum-sucks the decompression chamber;

a supplying section which supplies steam at an atmospheric pressure superheated to a temperature equal to or higher than a boiling temperature by high-frequency heating to the steam chamber; and a discharging section which discharges the superheated steam from the steam chamber.

Further, according to a fifth aspect of the present invention, there is provided an apparatus for desalinating sea water in which a condenser is connected to a vacuum-suction port of the concentrating apparatus used in the fourth aspect of the present invention through a vacuum pump.

According to the first to fifth aspects of the present invention, deep water is evaporated under a vacuum environment using superheated steam, which is heated to a temperature equal to or higher than a saturation temperature, as a heat source and therefore, water in sea water can be separated in a short period of time. By condensing the steam, fresh water including very small amount of contents, concentrated sea water remaining in the decompression chamber and the like can be obtained. When a vacuum degree of the decompression chamber is increased, water is boiled significantly, various kinds of compounds included in deep water are entrapped into steam and mixing of a solute into distilled water is increased, and when the vacuum degree is reduced, a rate of a remaining solute in the remaining concentrated sea water is increased. By setting the vacuum degree in the decompression chamber by utilizing this feature, a rate of the obtained fresh water to small amount of contents in the concentrated sea water can be changed and thereby desalinated deep water and concentrated deep water in accordance with usage can be obtained.

According to the first to fifth aspects of the present invention, superheated steam, which is inductively heated by a high-frequency coil or the like, is used as a heat source for heating sea water such as deep water or the like. As is well known, temperature of water does not increase beyond the boiling temperature (about 100° C.) at an atmospheric pressure (atmospheric pressure). When steam water at high temperature is desired in order to increase a processing speed, the steam chamber needs to be pressurized. In contrast, according to the method of obtaining superheated steam by high-frequency heating, superheated steam at 200° C. or higher can be obtained even at the atmospheric pressure. Further, electrons are excited when water molecules pass an electromagnetic field, and bonding between molecules and bonding of a molecule itself are loosened. Thus, molecules become finer and thereby heat transmission is increased. That is, a synergic effect of increasing a heat conducting rate by enlarging a temperature-difference and increasing the heat conducting rate by making steam molecules finer is obtained by using superheated steam heated by high frequency, instead of using saturated steam at the atmospheric pressure, as steam for heating, and therefore processing speed can be increased.

Superheated steam is obtained by receiving heat from a tube wall heated by passing saturated steam obtained in a boiler through a metal tube which is wound with a high-frequency coil. By using a nonconductive tube, such as a glass tube, a ceramic tube or the like which is wound with a high-frequency coil, as the tube for passing the saturated steam, superheated steam which is excellent in heat transmission can be obtained more efficiently.

Further, by adopting a method of passing water, which is sprayed in air, through a nonconductive tube wound with a high-frequency coil and heating the water by high frequency, superheated steam can be obtained quickly by a simple apparatus and the cost of the apparatus can be lowered.

Further, the above-described evaporating step can be performed, while rotating a rotary drum having a decompression chamber and a steam chamber. In this case, a heat conducting rate can be increased by increasing a heat conducting area, by forming a heat conducting wall between the decompression chamber and the steam chamber so as to have folds in parallel with an axial direction of the rotary drum. Concentrated sea water remaining in the decompression chamber can be taken out by vacuuming. By putting the taken-out concentrated sea water into a heating vessel and reheating the concentrated sea water by a pertinent heat source, salt can be obtained by further evaporating water.

Deep water can be supplied into the decompression chamber by utilizing negative pressure of the decompression chamber. Water evaporated in the decompression chamber is introduced from a vacuum-suction port to a vacuum pump and condensed to fresh water in a condenser. The steam can also be heated by a high-frequency coil and thereafter condensed to fresh water.

DETAILED DESCRIPTION OF THE EMBODIMENT

Figure 1:
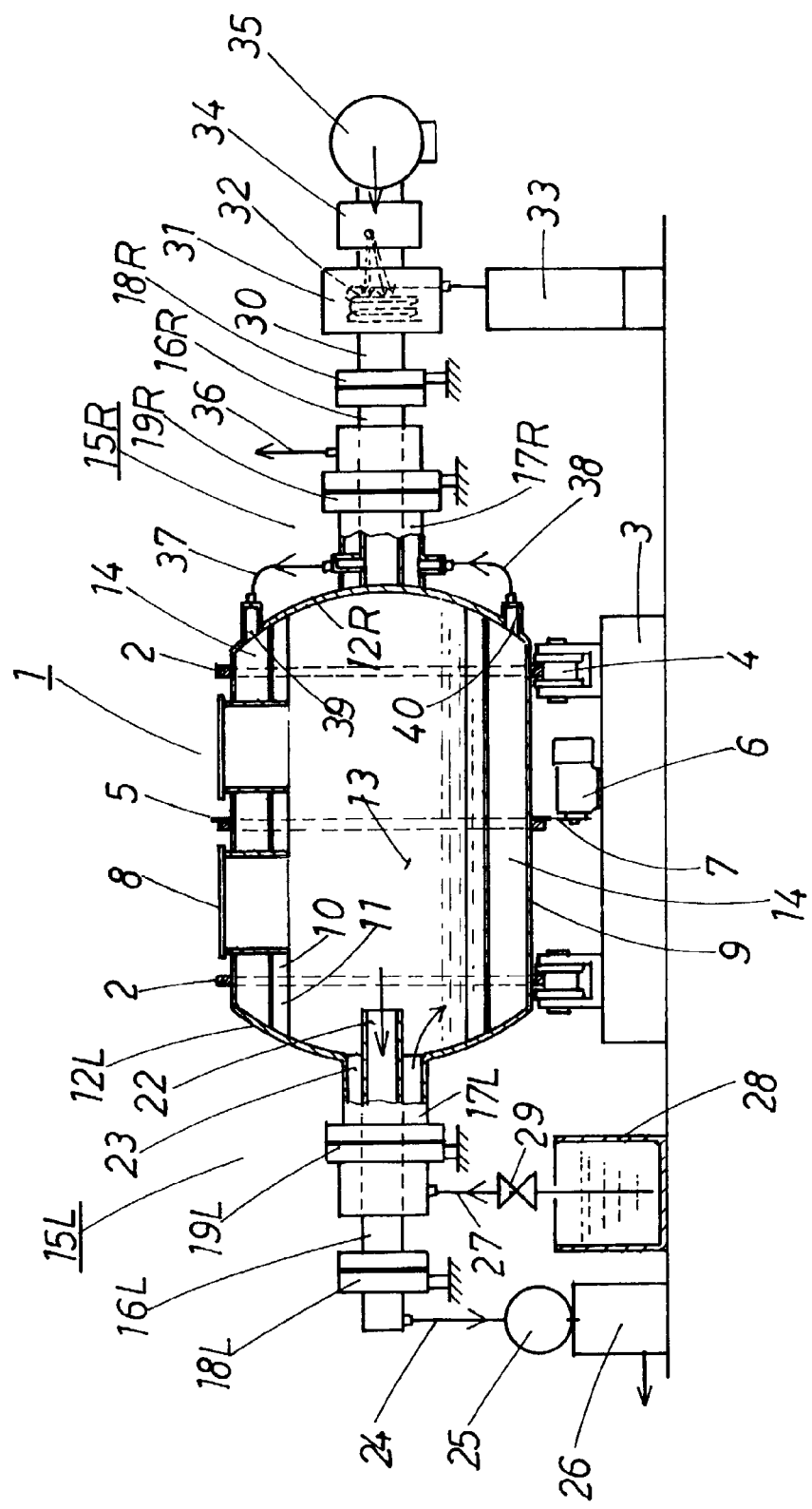
FIG. 1 is a schematic sectional side view showing an embodiment of a desalinating and condensing apparatus according to the invention.

FIG. 1 is a schematic view showing an embodiment of an apparatus for desalinating sea water according to the invention. A rotating drum 1 constituting a processing vessel is formed in a cylindrical shape and provided with supporting flanges 2 at outer peripheral portions on both sides thereof and is rotatably supported by a base 3 freely around a horizontal axis by supporting two portions in the circumference of each of the supporting flanges 2 by a supporting roller 4 above the base 3. A ring-like sprocket 5 is fixed to a central portion of an outer periphery of the rotary drum 1 and the sprocket 5 and a sprocket (notation is not attached) attached to an output shaft of a motor 6 are connected by a chain 7 for driving the rotary drum 1.

Figure 2:
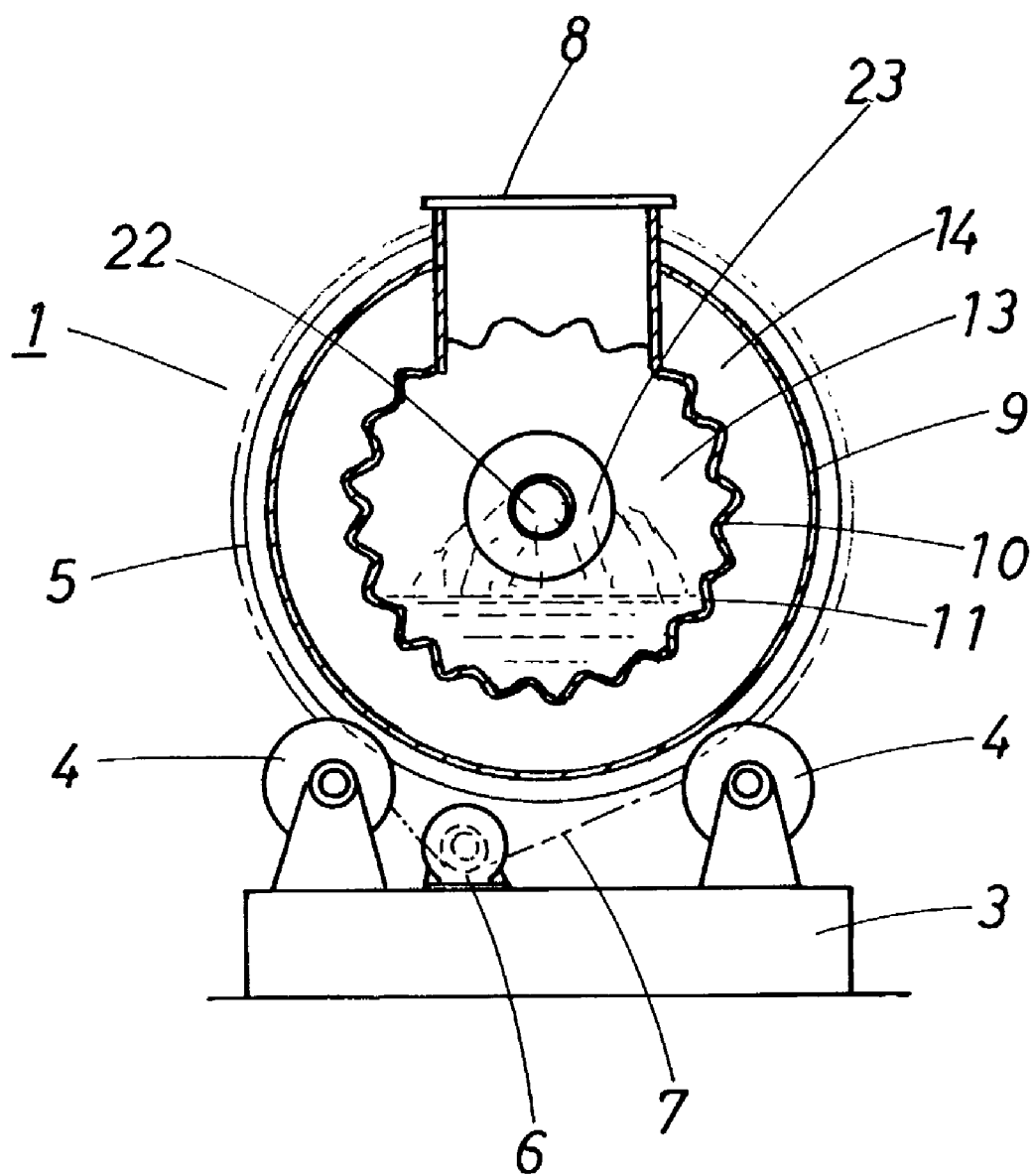
FIG. 2 is a vertical sectional view of a rotating drum of the apparatus of FIG. 1.

The rotary drum 1 is provided with opening and closing doors 8 fitted with transparent glass at several portions of the outer periphery. On an inner side of an outer peripheral wall 9 there is provided a heat conducting wall 11 formed with a number of folds 10 in an axial direction by being bent into a deep waveform as shown by FIG. 2. As shown by FIG. 1, the heat conducting wall 11 is arranged by fixing both ends thereof to panel boards 12L and 12R of the rotary drum 1 in airtight. As a result, an inner portion of the rotary drum 1 is partitioned into a decompression chamber 13 on an inner side of the heat conducting wall 11 and a steam chamber 14 on an outer side thereof.

Centers of the panel boards 12L and 12R on the both sides of the rotary drum 1 are respectively fixed with double tubes 15L and 15R and end portions of inner tubes 16L and 16R and outer tubes 17L and 17R of the respective double tubes 15L and 15R, are respectively connected with rotary couplings 18L and 19L, 18R and 19R. A base end of the inner tube 16L of the double tube on the left side of FIG. 1, constitutes a vacuum-suction port 22 projected to open to inside of the decompression chamber 13 and a base end of the outer tube 17L constitutes a sea water injecting port 23 opened in a ring-like shape at an inner face of the panel board 12L. The vacuum-suction port 22 is connected to a vacuum pump 25 via the rotary coupling 18L and a vacuum pipe 24. A condenser 26 is connected to a delivery side of the vacuum pump 25. The sea water injecting port 23 is connected to a sea water tank 28 via the rotary coupling 19L and a sea water pipe 27. The sea water pipe 27 is provided with an opening and closing valve 29.

The rotary coupling 18R is connected to a steam supply pipe 30 made of a nonconductive material of, for example, ceramic. The steam supply pipe 30 is provided with a high-frequency heater 31 and a high-frequency coil 32 wound around the steel supply pipe 30 is connected to a high-frequency power source 33. A water spray apparatus 34 for spraying water into the steam supply pipe 30, is provided in the steam supply pipe 30 on the front side (upstream side of stem flow) of the high-frequency heater 31 and a pushing fan 35 is provided on a further upstream side thereof. A steam discharging pipe 36 is connected to the rotor coupling 19R of the outer tube 17R of the double tube on the right side of FIG. 1. The inner tube 16R and the outer tube 17R are opened to an end portion of the stem chamber 14 via connection tubes 37 and 38 extended in the radius direction as a supply port 39 and a discharge port 40.

Next, an explanation will be given of a method of desalinating deep water which is carried out by using the above-described apparatus of the embodiment. Deep water sampled from deep sea is charged into the sea water tank 28. Inside of the decompression chamber 13 is vacuumed by operating the vacuum pump 25 and the condenser 26. Further, the pushing fan 35 is operated, high-frequency current is made to flow to the coil 32 of the high-frequency heater 31 and water is sprayed from the water spray apparatus 34. The sprayed water is heated by high frequency and is made to flow into the steam chamber 14 by the pushing fan 35 along with air.

By providing the high-frequency heater 31 having a sufficient capacity, the sprayed water is superheated to about 200° C. under ordinary pressure. When the opening and closing valve 29 is opened under the state, deep water in the sea water tank 28 is sucked into the decompression chamber 13. When a pertinent amount of deep water is sucked, the opening and closing valve 29 is closed and the rotary drum 1 is continuously rotated. Water in deep water in the decompression chamber 13, is evaporated by being heated by the heat conducting wall 11 heated by superheated steam of the steam chamber 14 and sucked by the vacuum pump 25 and condensed in the condenser 26. Deep water is supplied into the decompression chamber 13 by pertinently opening and closing the opening and closing valve 29 to replenish an evaporated water. When the sea water tank 28 is emptied and deep water in the decompression chamber 13 is condensed, the apparatus is stopped.

Various kinds of compounds dissolving in deep water remain in the decompression chamber 13 in a condensed state and therefore, the compounds are vacuumed to recover by opening the opening and closing door 8. The recovered concentrated deep water is pertinently diluted and used as raw material of condiment, health food and addition solution of cosmetics. Further, the obtained concentrated deep water is put into a heating vessel and heated further by a gas stove or the like to thereby provide salt by evaporating the water. The obtained salt is used as raw material of condiment. Distilled water condensed in the condenser 26 is used as raw material of soft drink water or cosmetic water as the desalinated deep water.

Figure 3:
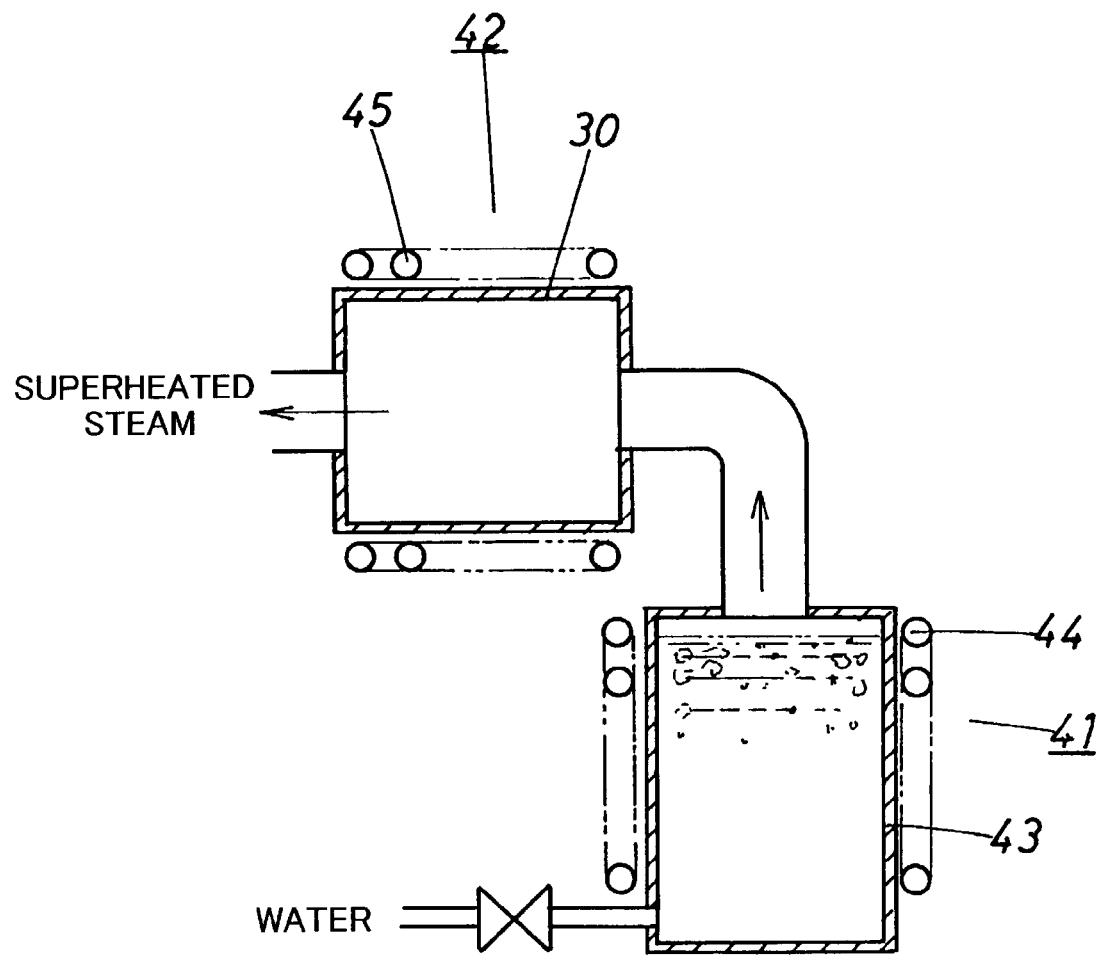
FIG. 3 is a schematic sectional side view showing other example of a superheated stem generating apparatus.

FIG. 3 is a view showing other apparatus for providing superheated steam used in the method of the invention. The apparatus of FIG. 3 is provided with a boiler 41 for obtaining saturated steam and a superheating apparatus 42 of the obtained saturated steam. The boiler 41 is constituted by winding a high-frequency coil 44 at a surrounding of a drum 43 made of a metal at an interval therebetween. By putting water to the drum 43 and applying high-frequency current to the coil 44, water is boiled by transmitting heat of an inductively heated drum wall to water in the drum to thereby generate saturated steam. The superheating apparatus 42 is constituted by winding a high-frequency coil 45 at a surrounding of a steam supply tube 30 made of ceramic for passing saturated steam. The saturated steam generated by the boiler 41 is inductively heated by the high-frequency coil 45 during a time period of passing the vapor supply tube 30 to constitute superheated steam and supplied to the steam chamber.

According to the embodiment explained above, solute contents in fresh water obtained by evaporating and condensing deep water and remaining concentrated sea water can be adjusted, and desalinated deep water and concentrated deep water with a rate of a mineral content changed in accordance with use can easily be obtained. Further, by using superheated steam heated by high frequency as heating means for distilling or condensing deep water, there is achieved an effect capable of carrying out swift processing by promoting a heat conduction efficiency, capable of providing the compact processing apparatus inexpensively and capable of carrying out efficient desalinating or condensing processing at low cost at a food processing plant, a cosmetic plant or the like.

The present invention is not limited to the above-described embodiment, and various modifications can be made within the scope of the invention. For example, the inner tube 16L of the double tube 15L shown in FIG. 1 is used for steam suction and the outer tube 17L of the double tube 15L is used for sea water supply in this embodiment, but the inner tube 16L may be used for sea water supply and the outer tube 17L may be used for steam suction. It is preferable to use a tube having less cross-sectional area for sea water supply to a decompression chamber, and a tube having larger cross-sectional area for steam suction.

What is claimed is:

1. A method of desalinating sea water comprising steps of:
    injecting sea water into a decompression chamber;
    evaporating water in the sea water by heating the sea water in the decompression chamber by supplying steam at an atmospheric pressure superheated to a temperature equal to or higher than a boiling temperature by high-frequency heating to a steam chamber formed around the decompression chamber with a heat conducting wall interposed therebetween; and
    obtaining fresh water by condensing the evaporated water, the method further comprising:
    a step of obtaining the steam by spraying air, which passes through a high-frequency coil, with water.

2. The method of desalinating sea water as defined in claim 1,
    wherein the evaporating step is performed while rotating a rotary drum having the decompression chamber and the steam chamber.

3. The method of desalinating sea water as defined in claim 2,
    wherein the evaporating step is performed while conducting heat in the steam chamber to the decompression chamber by the heat conducting wall having a number of folds in a direction parallel to a rotational center axis of the rotary drum.

4. The method of desalinating sea water as defined in claim 2,
    wherein the step of injecting sea water includes a step of injecting the sea water into the rotating decompression chamber through a first rotary coupling.

5. The method of desalinating sea water as defined in claim 4,
    wherein the step of obtaining fresh water is performed by introducing water in the evaporated sea water from the rotating decompression chamber into a condenser through a second rotary coupling.

6. The method of desalinating sea water as defined in claim 5, further comprising:
    a step of introducing the steam into the rotating steam chamber via a third rotary coupling.

7. The method of desalinating sea water as defined in claim 6, further comprising:
a step of discharging the steam from the rotating steam chamber through a fourth rotary coupling.

8. A method of concentrating sea water comprising steps of:
injecting sea water into a decompression chamber;
evaporating water in the sea water by heating the sea water in the decompression chamber by supplying steam at an atmospheric pressure superheated to a temperature equal to or higher than a boiling temperature by high-frequency heating to a steam chamber formed around the decompression chamber with a heat conducting wall interposed therebetween; and
obtaining the concentrated sea water remaining in the decompression chamber, and further comprising:
a step of obtaining the steam by spraying air, which passes through a high-frequency coil, with water.

9. A method of concentrating sea water comprising steps of:
injecting sea water into a decompression chamber;
evaporating water in the sea water by heating the sea water in the decompression chamber by supplying steam at an atmospheric pressure superheated to a temperature equal to or higher than a boiling temperature by high-frequency heating to a steam chamber formed around the decompression chamber with a heat conducting wall interposed therebetween; and
obtaining the concentrated sea water remaining in the decompression chamber, and further comprising:
a step of obtaining the steam by passing saturated steam, which is produced by a boiler, through a steam pipe wound with a high-frequency coil.

10. A method of desalinating sea water comprising steps of:
injecting sea water into a decompression chamber;
evaporating water in the sea water by heating the sea water in the decompression chamber by supplying steam at an atmospheric pressure superheated to a temperature equal to or higher than a boiling temperature by high-frequency heating to a steam chamber formed around the decompression chamber with a heat conducting wall interposed therebetween;
obtaining concentrated sea water remaining in the decompression chamber; and
obtaining salt by further evaporating water in the concentrated sea water.

11. A method of desalinating sea water comprising steps of:
injecting sea water into a decompression chamber;
evaporating water in the sea water by heating the sea water in the decompression chamber by supplying steam at an atmospheric pressure superheated to a temperature equal to or higher than a boiling temperature by high-frequency heating to a steam chamber formed around the decompression chamber with a heat conducting wall interposed therebetween; and
obtaining fresh water by condensing the evaporated water, the method further comprising:
a step of obtaining the steam by passing saturated steam, which is produced by a boiler, through a steam pipe wound with a high-frequency coil.

12. The method of desalinating sea water as defined in claim 11,
wherein the evaporating step is performed while rotating a rotary drum having the decompression chamber and the steam chamber.

13. The method of desalinating sea water as defined in claim 12,
wherein the evaporating step is performed while conducting heat in the steam chamber to the decompression chamber by the heat conducting wall having a number of folds in a direction parallel to a rotational center axis of the rotary drum.

14. The method of desalinating sea water as defined in claim 12,
wherein the step of injecting sea water includes a step of injecting the sea water into the rotating decompression chamber through a first rotary coupling.

15. The method of desalinating sea water as defined in claim 14,
wherein the step of obtaining fresh water is performed by introducing water in the evaporated sea water from the rotating decompression chamber into a condenser through a second rotary coupling.

16. The method of desalinating sea water as defined in claim 15, further comprising:
a step of introducing the steam into the rotating steam chamber via a third rotary coupling.

17. The method of desalinating sea water as defined in claim 16, further comprising:
a step of discharging the steam from the rotating steam chamber through a fourth rotary coupling.

18. An apparatus for concentrating sea water comprising:
a decompression chamber;
a steam chamber provided around the decompression chamber;
a heat conducting wall which divides the decompression chamber and the steam chamber;
a sea water injection section which injects sea water into the decompression chamber;
a vacuum-suction section which vacuum-sucks the decompression chamber;
a high-frequency heater having a high-frequency coil for obtaining steam by spraying air, which passes through the high frequency coil, with water;
a supplying section which supplies the steam at an atmospheric pressure superheated to a temperature equal to or higher than a boiling temperature by high-frequency heating, by the high-frequency heater, to the steam chamber; and
a discharging section which discharges the superheated steam from the steam chamber.

19. The apparatus for concentrating sea water as defined in claim 18, further comprising:
a rotary drum comprising the decompression chamber, the steam chamber and the heat conducting wall;
a first rotary coupling connected to the sea water injection section which rotates together with the rotary drum;
a second rotary coupling connected to the vacuum-suction section which rotates together with the rotary drum;
a third rotary coupling connected to the supplying section which rotates together with the rotary drum; and
a fourth rotary coupling connected to the discharging section which rotates together with the rotary drum.

20. The apparatus for concentrating sea water, as defined in claim 19,
wherein the heat conducting wall comprises a number of folds in a direction parallel to a rotational center axis of the rotary drum.

21. An apparatus for desalinating sea water comprising:
a decompression chamber;
a steam chamber provided around the decompression chamber;
a heat conducting wall which divides the decompression chamber and the steam chamber;
a sea water injection section which injects sea water into the decompression chamber;
a vacuum-suction section which vacuum-sucks the decompression chamber;
a high-frequency heater having a high-frequency coil for obtaining steam by spraying air, which passes through the high frequency coil, with water;
a supplying section which supplies the steam at an atmospheric pressure superheated to a temperature equal to or higher than a boiling temperature by high-frequency heating, by the high-frequency heater, to the steam chamber;
a discharging section which discharges the superheated steam from the steam chamber; and
a condenser connected to the vacuum-suction section through a vacuum pump.

22. The apparatus for desalinating sea water as defined in claim 21, further comprising:
a rotary drum comprising the decompression chamber, the steam chamber and the heat conducting wall;
a first rotary coupling connected to the sea water injection section which rotates together with the rotary drum;
a second rotary coupling connected to the vacuum-suction section, which rotates together with the rotary drum, and the vacuum pump;
a third rotary coupling connected to the supplying section which rotates together with the rotary drum; and
a fourth rotary coupling connected to the discharging section which rotates together with the rotary drum.

23. The apparatus for desalinating sea water as defined in claim 22,
wherein the heat conducting wall comprises a number of folds in a direction parallel to a rotational center axis of the rotary drum.

* * * * *